UNITED STATES PATENT OFFICE.

HENRY ALFRED DOERNER, OF DENVER, COLORADO, ASSIGNOR TO THE CHEMICAL PRODUCTS COMPANY, OF DENVER, COLORADO, A PARTNERSHIP COMPOSED OF LAFAYETTE M. HUGHES AND ROBERT V. BARKALOW.

METHOD OF PRODUCING HYDROGEN PEROXID.

1,235,664.        Specification of Letters Patent.     Patented Aug. 7, 1917.

No Drawing.     Application filed February 7, 1917. Serial No. 147,118.

*To all whom it may concern:*

Be it known that I, HENRY ALFRED DOERNER, a citizen of the United States, residing at Denver, county of Denver, State of Colorado, have invented certain new and useful Improvements in Methods of Producing Hydrogen Peroxid; and I do hereby declare the following to be a full, clear, and exact description of the invention, such as will enable others skilled in the art to which it appertains to make and use the same.

This invention relates to a method of producing hydrogen peroxid of high purity by the action of carbonic acid on barium peroxid.

It is the object of the invention to provide an economical method for the manufacture of hydrogen peroxid of high purity.

Perhaps the best known method of producing hydrogen peroxid involves the treatment of powdered barium peroxid with phosphoric acid, the barium phosphate produced being filtered off from the resulting hydrogen peroxid solution and being treated with sulfuric acid in order to recover the phosphoric acid and to give barium sulfate. This method involves two separate operations and results ultimately in the conversion of the sulfuric acid used into barium sulfate.

It is known, as a matter of chemical knowledge, and is mentioned in various texts on chemistry, that hydrogen peroxid can be produced by the action of carbonic acid on barium peroxid. At ordinary temperatures and pressures, however, the solubility of carbon dioxid in water to form carbonic acid is not sufficient to enable satisfactory results to be obtained in this way. Heretofore, so far as I am aware, no satisfactory yields have been obtainable by this method nor has any attempted application of this method been made on a commercial scale.

As the result of my investigations, I have discovered that it is possible to obtain a good yield of hydrogen peroxid by the action of carbonic acid on barium peroxid, by the use of carbon dioxid under a pressure sufficient to keep the solution at the proper acidity and by maintaining a proper temperature during the reaction. This temperature should, in practice, be low enough to retard the decomposition of the hydrogen peroxid formed, In the practice of the invention, various kinds and types of apparatus are available for use in which provision is made for the introduction of carbon dioxid under a sufficient pressure and for maintaining the necessary pressure and strength of carbonic acid solution and in which provision is also made for introducing the barium peroxid and for maintaining the necessary temperature and intimacy of intermixture. From one viewpoint, the invention is one involving a reaction between a solid and a gas in the presence of a liquid in which the solid is dissolved or maintained in suspension and in which the gas is dissolved or into which the gas is brought into intimate contact. As will be evident to those skilled in the art, various types of apparatus are available for bringing about such a reaction. The absorption of the carbon dioxid in the water can thus be promoted by bubbling the gas through the water or by filming or spraying the water through an atmosphere of the gas or by mechanically agitating a mixture of the liquid and gas or by spreading out the liquid in an absorption tower in the presence of the gas, etc., the barium dioxid being mixed with the water in the proper proportions and the necessary pressure and temperature being maintained for the reaction.

I have found that good results are obtained when the temperature is maintained at or slightly above 0° C. but this temperature is capable of variation considerably from this particular temperature. The cooling or refrigeration should be sufficient not only to neutralize the heat of the reacting bodies and that of the apparatus and its contents, but also to take care of a considerable amount of heat due to the chemical reaction which takes place.

In the practice of the process of the invention, where separate charges of hydrogen peroxid are to be produced, sufficient water to give the desired strength of hydrogen peroxid may be cooled to the required degree and carbon dioxid then introduced under pressure. The barium dioxid may be then introduced continuously but at a rate which is not fast enough to neutralize the carbonic acid and make the solution alkaline. The carbon dioxid pressure is maintained so that it will be absorbed by the solution as fast as it is neutralized by the barium dioxid. Accordingly, the rate of introduction of the barium dioxid will depend upon the pressure of carbon dioxid used and the acidity of the solution corresponding to such presure. During the reaction, the solution should be agitated or intimate intermixture otherwise effected so that the reaction will take place uniformly and so that the desired acidity may be maintained.

The pressure of carbon dioxid used will depend upon the size and shape of the apparatus, the amount of agitation and the nature of the agitation produced, the rate at which the barium dioxid is introduced, and like considerations. Where carbon dioxid is available under high pressures and the apparatus is capable of withstanding such high pressures, the reaction can be correspondingly facilitated and the time of reaction reduced.

When the desired strength of hydrogen peroxid has been produced the supply of barium dioxid and of carbon dioxid is discontinued and the intermixture or agitation continued for a further period of time, say 15 minutes, to insure completion of the reaction of the barium dioxid present. The barium carbonate resulting from the reaction is then filtered off in a filter-press or in other suitable apparatus. The barium carbonate precipitate is then washed free from hydrogen peroxid with water and the barium carbonate thus produced is available for use in a fine state of sub-division.

The hydrogen peroxid solution obtained will contain a small amount of barium bicarbonate. This may be removed by adding a calculated quantity of sulfuric acid and filtering off the precipitated barium sulfate.

The hydrogen peroxid solution thus obtained is of high purity and is substantially free from impurities such as commonly accompany the production of hydrogen peroxid by methods previously known. So also, it is substantially free from inorganic acids and such impurities as are incident to their use. Furthermore, the reagents required for the production of the hydrogen peroxid are barium peroxid, water, and carbonic acid gas which is available as a gaseous reagent, thus making it unnecessary to use liquid acids for the decomposition of the barium peroxid.

The carbon dioxid can be produced by any suitable method. It may be of high strength or it may be diluted with inert gases which do not take part in the reaction but which are permitted to escape after the absorption of the carbon dioxid therefrom has taken place. Thus, where the operation is carried out in a continuous manner, the absorption of carbon dioxid may take place continuously, either from carbon dioxid gas itself, or from gaseous mixtures of carbon dioxid and inert gases, the supply of the carbon dioxid or of the gaseous mixture being maintained and any inert gases being permitted to escape.

Where the process is carried out in an intermittent manner, to produce separate charges of hydrogen peroxid, the apparatus may consist of an air-tight tank, preferably a vertical cylindrical tank provided with stirrers and a false bottom of a suitable filtering medium, an outlet pipe provided with a controlling valve being arranged below the false bottom. Access to the interior of the tank may be obtained through a manhole. Suitable valve controlled inlets for the carbon dioxid, compressed air and barium dioxid are provided. Since the carbon dioxid is introduced under pressure and since a pressure of this gas is maintained, provision must also be made for introducing the barium dioxid into the tank under pressure, a pump or other suitable means being used for this purpose. Where the carbon dioxid is not already available under a sufficient pressure, suitable means may be provided for compressing it to the required degree for example, to a pressure of 100 pounds per sq. inch, and for maintaining the pressure during the reaction. A small outlet pipe for taking test samples may be provided and a pressure gage and thermometer tube are desirable accessories. Suitable refrigeration means such as a refrigerating coil or jacket are also provided for maintaining the tank and its contents at a low temperature, this temperature varying as above stated but being preferably about 0° C. or somewhat thereabout.

In such an apparatus sufficient water is introduced into the tank and cooled and the carbon dioxid is then introduced under pressure as above stated and the barium dioxid introduced, the whole charge being continuously stirred and the supply of barium dioxid and carbon dioxid being maintained in the manner above described. In such an apparatus the barium carbonate produced can be filtered off by the false bottom. The filtration is promoted by the pressure of the carbon dioxid within the tank or by the introduction of compressed air if necessary. The barium carbonate can then be washed and the hydrogen peroxid recovered therefrom.

Having thus described my invention, what I claim is:

1. The method of producing hydrogen peroxid, which comprises reacting upon barium peroxid with carbonic acid under pressure and at a low temperature.

2. The method of producing hydrogen peroxid, which comprises reacting upon barium peroxid with carbonic acid under pressure at a temperature in the neighborhood of 0° C.

3. The method of producing hydrogen peroxid, which comprises absorbing carbon dioxid under pressure in water and thereby producing a solution of carbonic acid, introducing barium peroxid into such solution and maintaining the temperature sufficiently low to prevent objectionable decomposition of the hydrogen peroxid formed.

4. The method of producing hydrogen peroxid, which comprises absorbing carbon dioxid in water, introducing barium peroxid gradually into such solution and maintaining the pressure of carbon dioxid during such introduction, an excess of carbonic acid being maintained during the reaction and the temperature of the reaction being sufficiently low to prevent objectionable decomposition of the hydrogen peroxid formed.

5. The method of producing hydrogen peroxid, which comprises introducing carbon dioxid and barium peroxid in the water and agitating the same to produce an intimate mixture, the carbon dioxid being maintained under pressure and the temperature of the reaction being below that of objectionable decomposition of the hydrogen peroxid formed.

6. The method of producing hydrogen peroxid, which comprises introducing carbon dioxid under pressure and barium peroxid into water cooled to about 0° C., agitating the resulting mixture and maintaining an excess of carbon dioxid during the reaction.

In testimony whereof I affix my signature, Jan. 31, 1917.

HENRY ALFRED DOERNER.